United States Patent
Li et al.

(10) Patent No.: US 12,196,655 B2
(45) Date of Patent: Jan. 14, 2025

(54) CASSETTE AND EMBEDDING METHOD USING SAME

(71) Applicant: LEICA BIOSYSTEMS NUSSLOCH GMBH, Nussloch (DE)

(72) Inventors: Zhongqiu Li, Shanghai (CN); Xufeng Yu, Shanghai (CN); Jue Chen, Shanghai (CN); Ying Xie, Shanghai (CN)

(73) Assignee: LEICA BIOSYSTEMS NUSSLOCH GMBH, Nussloch (DE)

( * ) Notice: Subject to any disclaimer, the term of this patent is extended or adjusted under 35 U.S.C. 154(b) by 0 days.

(21) Appl. No.: 18/686,910

(22) PCT Filed: Nov. 10, 2021

(86) PCT No.: PCT/CN2021/129714
§ 371 (c)(1),
(2) Date: Feb. 27, 2024

(87) PCT Pub. No.: WO2023/082079
PCT Pub. Date: May 19, 2023

(65) Prior Publication Data
US 2024/0385090 A1    Nov. 21, 2024

(51) Int. Cl.
*G01N 1/00*    (2006.01)
*G01N 1/36*    (2006.01)

(52) U.S. Cl.
CPC ......... *G01N 1/36* (2013.01); *G01N 2001/366* (2013.01)

(58) Field of Classification Search
None
See application file for complete search history.

(56) References Cited

U.S. PATENT DOCUMENTS 3,768,914 A    10/1973    Kinney et al.
8,329,120 B2*  12/2012    Williamson, IV ..........
                                          G01N 33/4833
                                          206/486

FOREIGN PATENT DOCUMENTS

| CN | 107576558 A | 1/2018 |
| CN | 109916681 A | 6/2019 |
| CN | 211122192 U | 7/2020 |
| CN | 111693356 A | 9/2020 |
| CN | 112067408 A | 12/2020 |

* cited by examiner

*Primary Examiner* — Jyoti Nagpaul
(74) *Attorney, Agent, or Firm* — Kinney & Lange, P.A.

(57) ABSTRACT

A cassette and an embedding method using the same are provided. The cassette includes: a frame including an accommodating member configured to accommodate the tissue, the accommodating member having a first opening and a second opening opposite to each other; a first holder connected to the frame, and configured to rotate relative to the frame to open or close the first opening of the accommodating member; and a second holder connected to the frame, and configured to rotate relative to the frame to open or close the second opening of the accommodating member.

19 Claims, 7 Drawing Sheets

100

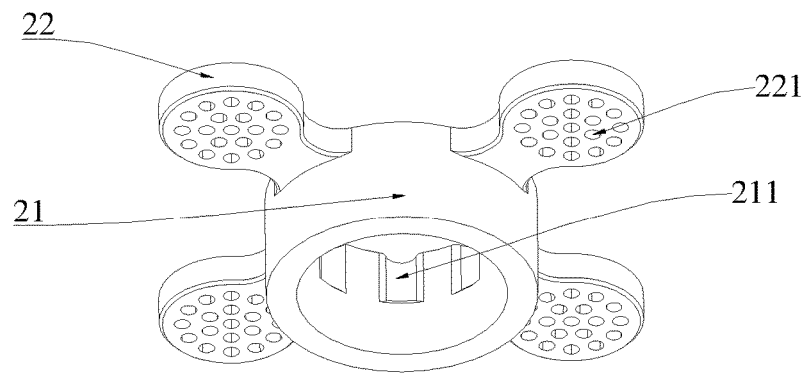
Fig. 8
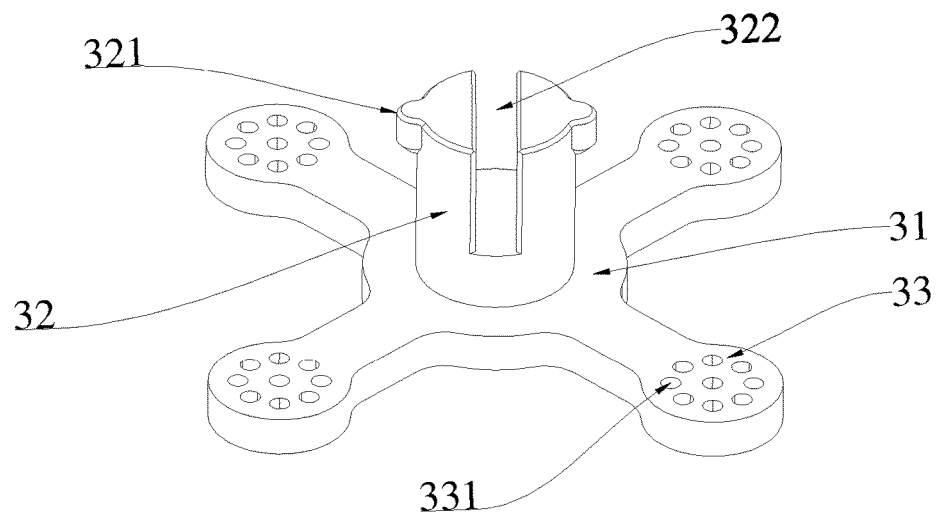
Fig. 9
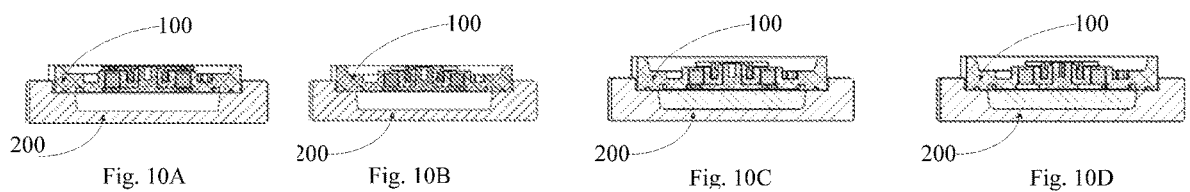
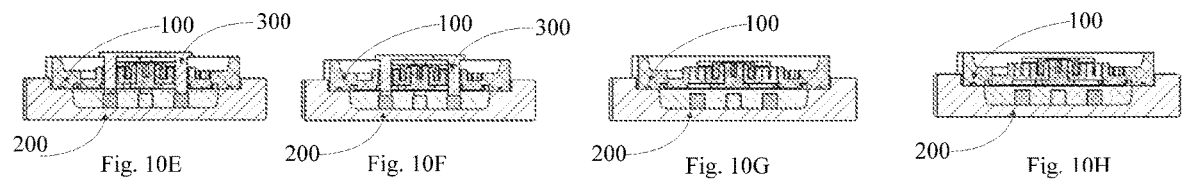
Fig. 10 placing the cassette with the tissue on a mold, in which the first holder closes the first opening of the accommodating member and the second holder closes the second opening of the accommodating member — 1002 rotating the first holder to open the first opening of the accommodating member — 1003 dispensing liquid paraffin into the cassette and the mold, and cooling the liquid paraffin in the mold to a semi-molten state — 1004 rotating the second holder to open the second opening of the accommodating member — 1005 pushing the tissue into the mold — 1006 dispensing further liquid paraffin into the cassette and the mold — 1007 cooling the liquid paraffin in the cassette and the mold to a solid state

Fig. 11

CASSETTE AND EMBEDDING METHOD USING SAME

FIELD

The present disclosure relates to a field of tissue processing and embedding, and more particularly to a cassette and an embedding method using the same.

BACKGROUND

A biopsy is the removal of a tissue sample to examine tissue for signs of cancer or other disorders. Tissue samples are obtained in a variety of ways using various medical procedures involving a variety of the sample collection devices. For example, biopsies may be open (surgically removing tissue) or percutaneous (e.g. by fine needle aspiration, core needle biopsy or vacuum assisted biopsy).

After the tissue sample is collected, the tissue sample is analyzed at a lab (e.g. a pathology lab, biomedical lab, etc.) that is set up to perform the appropriate tests (such as histological analysis). In order to properly process the tissue sample, a series of steps may be performed, including: grossing of the tissue sample by cutting the tissue sample to the proper size for analysis; processing of the tissue sample to immobilize molecular components and/or prevent degradation, generally including fixation, dehydration, and clearing of the tissue sample; embedding the tissue sample in an embedding material, such as paraffin wax; sectioning the embedded tissue sample by using, for example, a microtome.

Currently, after the processing of the tissue sample, a user needs to open the cassette and transfer the tissue sample to an embedding mold, and also needs to orientate and embed the tissue sample, which will reduce the user's working efficiency.

U.S. Pat. No. 8,329,120B2 relates to tissue orientation devices which include a perforated tissue support with at least one perforated channel for receiving a tissue sample, and a plurality of tabs configured to extend along and into the channel to retain the tissue sample during processing and embedding. Tissue orientation devices include elongated legs coupled together for holding one or more biopsy tissue samples therebetween. Associated methods include using the cassettes and orientation devices to hold and orient tissue samples for processing, embedding and microtome sectioning.

Although the above devices or methods allow the tissue sample to be embedded relatively conveniently, the user needs to section the cassette material, which will decrease the life of the microtome blade and reduce the sectioning efficiency and the slides quality due to micro defects on the blade edge caused by the cassette material. Further, the residual of the cassette material around or beside the tissue will impact the sides viewing and diagnosing.

SUMMARY

Embodiments of the present disclosure seek to solve at least one of the problems existing in the prior art to at least some extent, and thus provide a cassette and an embedding method using the same.

According to embodiments of the present disclosure, there is provided a cassette for a tissue. The cassette includes: a frame including an accommodating member configured to accommodate the tissue, the accommodating member having a first opening and a second opening opposite to each other; a first holder connected to the frame, and configured to rotate relative to the frame to open or close the first opening of the accommodating member; and a second holder connected to the frame, and configured to rotate relative to the frame to open or close the second opening of the accommodating member.

In the cassette according to the embodiments of the present disclosure, since both the first holder and the second holder are rotatable with respect to the frame, they can be rotated to open or close the openings of the accommodating member during embedding of the tissue, so that the tissue does not need to be taken out of the cassette and further transferred to a mold, and a paraffin block including the tissue can be obtained without the second holder (i.e. a bottom part of the cassette). That is, the bottom part of the cassette does not need to be cut, and no cassette material remains around the tissue. Thus, the lifetime of a blade of a microtome is improved, and the slides quality and the slides viewing and diagnosing are improved. Further, it is easy and convenient to embed the tissue with this cassette, thus enhancing the working efficiency of a user.

In some embodiments, the frame includes: a peripheral wall; and a bearing plate surround by the peripheral wall and connected to the peripheral wall, the bearing plate including a first side and a second side facing away from each other. The accommodating member is arranged on the first side of the bearing plate, the bearing plate has a first hole aligned with the second opening of the accommodating member, the first holder is arranged on the first side of the bearing plate and configured to rotate relative to the bearing plate to open or close the first opening of the accommodating member, and the second holder is arranged on the second side of the bearing plate and configured to rotate relative to the bearing plate to open or close the first hole of the bearing plate and the second opening of the accommodating member.

In some embodiments, the bearing plate is provided with a plurality of openings arranged in an array, and each opening runs through the bearing plate in a thickness of the bearing plate.

In some embodiments, the frame further includes a connecting column arranged on the first side of the bearing plate and spaced apart from the accommodating member, the connecting column has a through hole along an axis thereof, the bearing plate has a second hole aligned with the through hole of the connecting column, the first holder is fitted over the connecting column and configured to rotate around the axis of the connecting column, and the second holder is fitted in the second hole of the bearing plate and the through hole of the connecting column, and configured to rotate around the axis of the connecting column.

In some embodiments, the first holder includes a sleeve fitted over the connecting column and a first arm extending outwards from an outer peripheral surface of the sleeve, the sleeve is configured to rotate around the connecting column to drive the first arm to open or close the first opening of the accommodating member.

In some embodiments, the sleeve includes first grooves in an inner peripheral surface thereof, the first grooves are spaced apart from one another along a circumferential direction of the sleeve, the connecting column includes two first protrusions on an outer peripheral surface thereof, the two first protrusions face away from each other in a diameter direction of the connecting column, and are configured to be fitted in two of the first grooves when the first arm opens or closes the first opening of the accommodating member.

In some embodiments, the first groove extends along the axis of the connecting column and terminates at a position between a top and a bottom of the sleeve.

In some embodiments, a free end of the first arm has a shape matching with a shape of the first opening of the accommodating member, and is provided with third holes.

In some embodiments, four accommodating members are provided, surround the connecting column, and spaced apart from one another, the first holder includes four first arms surrounding the sleeve and spaced apart from one another, the four first arms correspond with the four accommodating members one to one, and each first arm is configured to open or close the first opening of the corresponding accommodating member.

In some embodiments, the second holder includes: a base plate; a connecting shaft arranged on the base plate and fitted in the through hole of the connecting column; and a second arm extending outwards from an outer peripheral surface of the base plate. The base plate and the second arm are attached to the second side of the bearing plate, and the connecting shaft is configured to rotate in the through hole of the connecting column around the axis of the connecting column to drive the second arm to open or close the first hole of the bearing plate and the second opening of the accommodating member.

In some embodiments, the connecting column includes two groups of second grooves in an inner peripheral surface thereof, the two groups of second grooves are opposite to each other in a diameter direction of the connecting column, and each group of second grooves includes two adjacent second grooves, the connecting shaft includes two second protrusions on an outer peripheral surface thereof, the two second protrusions face away from each other in a diameter direction of the connecting shaft, and are configured to be fitted in the two groups of second grooves when the second arm opens or closes the first hole of the bearing plate and the second opening of the accommodating member.

In some embodiments, the connecting shaft includes a notch in middle, and the two second protrusions are arranged on two sides of the notch and symmetrical with respect to the notch.

In some embodiments, four accommodating members are provided, surround the connecting column, and spaced apart from one another, the bearing plate has four first holes aligned with the second openings of the four accommodating members, respectively, the second holder includes four second arms surrounding the base plate and spaced apart from one another, the four second arms correspond with the four accommodating members one to one, and each second arm is configured to open or close the corresponding first hole and the second opening of the corresponding accommodating member.

In some embodiments, a free end of the second arm has a shape matching with a cross-sectional shape of the first hole of the bearing plate and a shape of the second opening of the accommodating member, and is provided with fourth holes.

In some embodiments, the second side of the bearing plate includes a recessed part, the base plate and the second arm of the second holder are received in the recessed part, and configured to rotate in the recessed part under the drive of the connecting shaft.

In some embodiments, bottom surfaces of the base plate and the second arm of the second holder are flush with the second side of the bearing plate.

In some embodiments, the accommodating member includes a plurality of vertical parts surrounding the first hole of the bearing plate and spaced apart from one another, each vertical part has an arc cross section, and the arc cross sections of the plurality of vertical parts cooperate with one another to form a shape matching with a cross-sectional shape of the first hole of the bearing plate.

Embodiments of the present disclosure further provide an embedding method, which uses the cassette according to any one of the above embodiments. The embedding method includes: placing the cassette with the tissue on a mold, in which the first holder closes the first opening of the accommodating member and the second holder closes the second opening of the accommodating member; rotating the first holder to open the first opening of the accommodating member; dispensing liquid paraffin into the cassette and the mold, and cooling the liquid paraffin in the mold to a semi-molten state; rotating the second holder to open the second opening of the accommodating member; pushing the tissue into the mold; dispensing further liquid paraffin into the cassette and the mold; and cooling the liquid paraffin in the cassette and the mold to a solid state.

In the embedding method according to the embodiments of the present disclosure, the first holder and the second holder are rotated to open or close the openings of the accommodating member in corresponding steps, so that the tissue can be pushed into the mold without being taken out of the cassette, and the paraffin block including the tissue can be obtained without the second holder (i.e. a bottom part of the cassette). That is, the bottom part of the cassette does not need to be cut, and no cassette material remains around the tissue. Thus, the lifetime of a blade of a microtome is improved, and the slides quality and the slides viewing and diagnosing are improved. Further, it is easy and convenient to embed the tissue with this embedding method, thus enhancing the working efficiency of a user.

In some embodiments, the tissue is pushed into the mold by a pusher, and the embedding method further comprises withdrawing the pusher after or before dispensing further liquid paraffin into the cassette and the mold.

In some embodiments, when the pusher is withdrawn before dispensing further liquid paraffin into the cassette and the mold, the embedding method further includes rotating the second holder to close the second opening of the accommodating member after withdrawing the pusher and before dispensing further liquid paraffin into the cassette and the mold.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference the accompanying drawings.

FIG. 8 is another perspective view of a first holder of a cassette according to an embodiment of the present disclosure.

FIG. 9 is a perspective view of a second holder of a cassette according to an embodiment of the present disclosure.

FIG. 10 is a perspective view illustrating an embedding method according to an embodiment of the present disclosure.

FIG. 11 is a block diagram of an embedding method according to an embodiment of the present disclosure.

DETAILED DESCRIPTION

Figure 1:
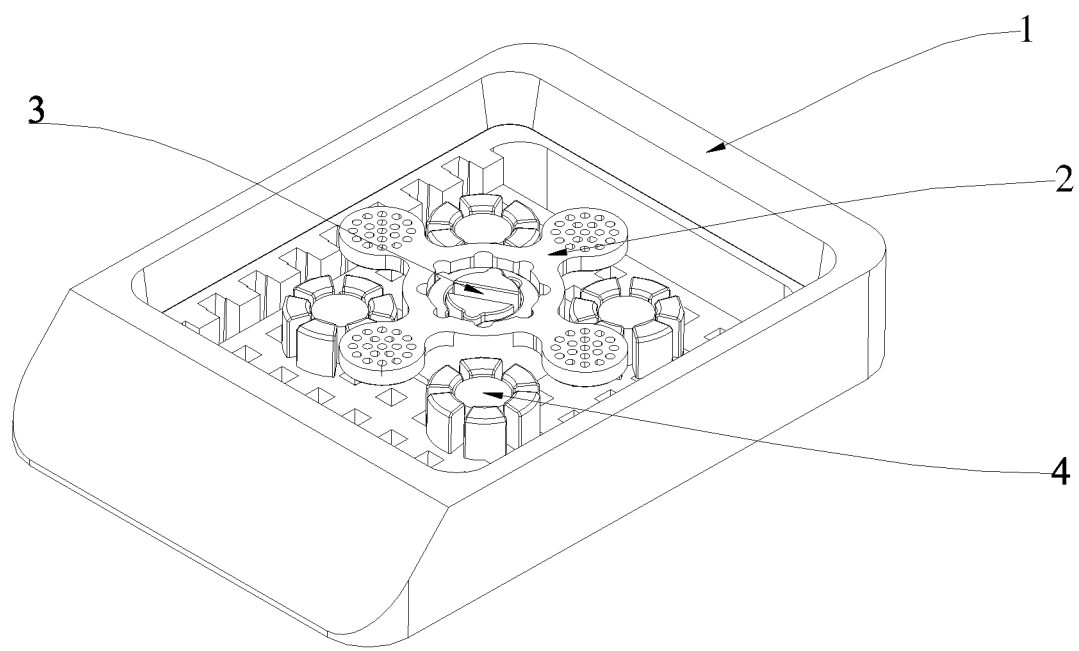
FIG. 1 is a perspective view of a cassette with a tissue according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front." "rear." and the like) are only used to simplify description of the present disclosure, and do not alone indicate or imply that the device or element referred to must have a particular orientation.

In addition, terms such as "first" and "second" are used herein for purposes of description and are not intended to indicate or imply relative importance or significance.

Embodiments of the present disclosure provide a cassette 100 for a tissue 4, as shown in FIGS. 1-4. The cassette 100 includes a frame 1, a first holder 2 and a second holder 3.

The frame 1 includes an accommodating member 14 configured to accommodate the tissue 4, and the accommodating member 14 has a first opening 141 and a second opening 142 opposite to each other. The tissue 4 may be placed into the accommodating member 14 through the first opening 141, and pushed out of the accommodating member 14 through the second opening 142. The first holder 2 is connected to the frame 1, and configured to rotate relative to the frame 1 to open or close the first opening 141 of the accommodating member 14. For example, the first holder 2 may be rotated to open the first opening 141 of the accommodating member 14, so that the tissue 4 can be placed into the accommodating member 14 through the first opening 141. Further, the first holder 2 may be rotated to close the first opening 141 of the accommodating member 14 after the tissue 4 is placed into the accommodating member 14, so as to hold the tissue 4 in the accommodating member 14. The second holder 3 is connected to the frame 1, and configured to rotate relative to the frame 1 to open or close the second opening 142 of the accommodating member 14. For example, the second holder 3 may be rotated to open the second opening 142 of the accommodating member 14, so that the tissue 4 in the accommodating member 14 can be pushed out of the accommodating member 14 through the second opening 142. Further, the second holder 3 may be rotated to close the second opening 142 of the accommodating member 14, so as to hold the tissue 4 in the accommodating member 14.

In some embodiments of the present disclosure, the first holder 2 may be configured as a cover part of the cassette 100, and the second holder 3 may be configured as a bottom part of the cassette 100.

In the cassette 100 according to the embodiments of the present disclosure, since both the first holder 2 and the second holder 3 are rotatable with respect to the frame 1, they can be rotated to open or close the openings of the accommodating member 14 during embedding of the tissue 4, so that the tissue 4 does not need to be taken out of the cassette 100 and further transferred to a mold, and a paraffin block including the tissue 4 can be obtained without the second holder 3 (i.e. the bottom part of the cassette 100). That is, the bottom part of the cassette 100 does not need to be cut, and no cassette material remains around the tissue 4. Thus, the lifetime of a blade of a microtome is improved, and the slides quality and the slides viewing and diagnosing are improved. Further, it is easy and convenient to embed the tissue 4 with the cassette 100, thus enhancing the working efficiency of a user.

Figure 5:
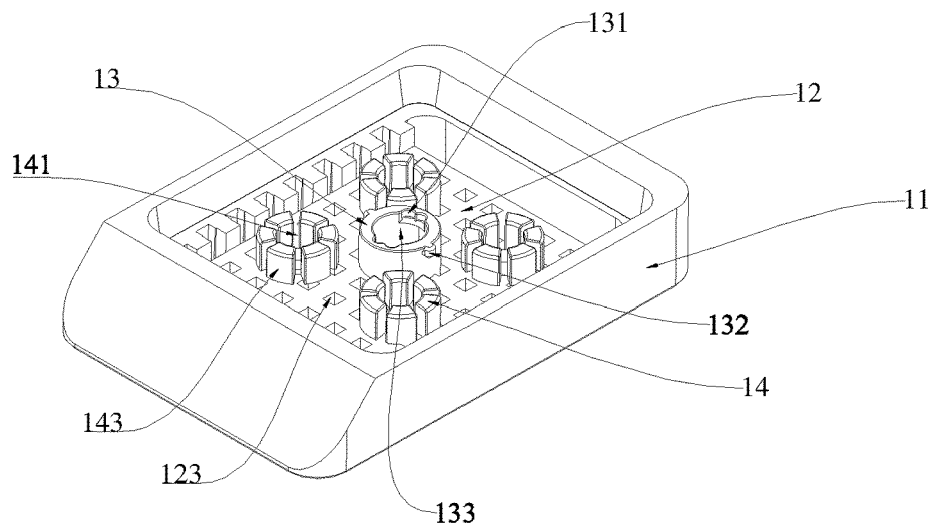
FIG. 5 is a perspective view of a frame of a cassette according to an embodiment of the present disclosure.
Figure 6:
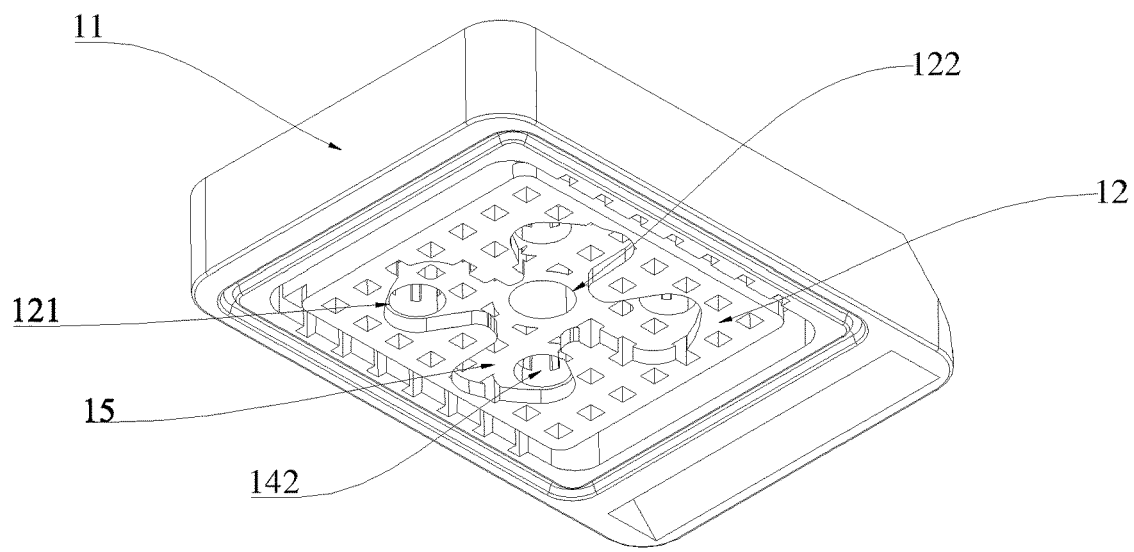
FIG. 6 is another perspective view of a frame of a cassette according to an embodiment of the present disclosure.
Figure 7:
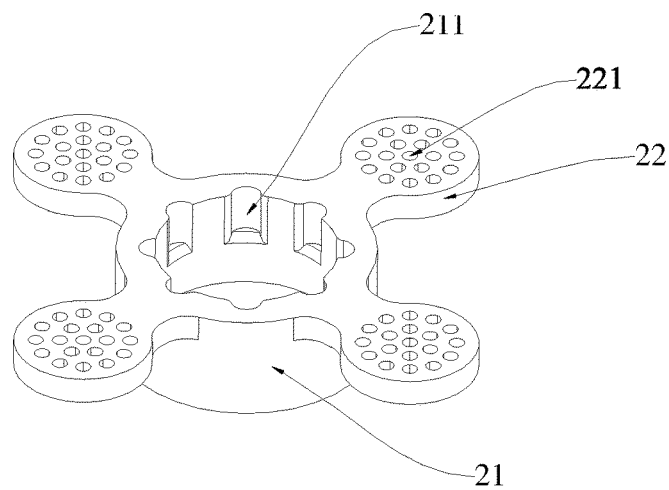
FIG. 7 is a perspective view of a first holder of a cassette according to an embodiment of the present disclosure.

In some embodiments of the present disclosure, as further shown in FIGS. 5 and 6, the frame 1 includes a peripheral wall 11 and a bearing plate 12, the bearing plate 12 is surround by the peripheral wall 11 and connected to the peripheral wall 11, and the bearing plate 12 includes a first side and a second side facing away from each other. For example, the bearing plate 12 may be integral with the peripheral wall 11 so as to increase the structural strength of the frame 1. The accommodating member 14 is arranged on the first side of the bearing plate 12, the bearing plate 12 has a first hole 121 aligned with the second opening 142 of the accommodating member 14, the first holder 2 is arranged on the first side of the bearing plate 12 and configured to rotate relative to the bearing plate 12 to open or close the first opening 141 of the accommodating member 14, and the second holder 3 is arranged on the second side of the bearing plate 12 and configured to rotate relative to the bearing plate 12 to open or close the first hole 121 of the bearing plate 12 and the second opening 142 of the accommodating member 14.

In some embodiments of the present disclosure, the first side of the bearing plate 2 may be an upper side of the bearing plate 2, and the second side of the bearing plate 2 may be a lower side of the bearing plate 2. In this case, the first holder 2 is located above the bearing plate 12, and the second holder 3 is located below the bearing plate 12. Also, both the first holder 2 and the second holder 3 are rotatably connected to the bearing plate 12.

Further, the bearing plate 12 is provided with a plurality of openings 123, the plurality of openings 123 are arranged in an array, i.e. in columns and rows, and each opening 123 runs through the bearing plate 12 in a thickness of the bearing plate 12. Thus, reagents for processing and embedding of the tissue 4, such as a dehydration reagent and paraffin, can pass through the bearing plate 12 via the plurality of openings 123. Moreover, the plurality of openings 123 are distributed uniformly, so that the reagents can flow through the bearing plate 12 evenly and smoothly.

In some embodiments of the present disclosure, the first hole 121 of the bearing plate 12 may overlap some of the plurality of openings 123. That is, a part of the bearing plate 12 which includes some of the plurality of openings 123 may be removed to form the first hole 121 of the bearing plate 12.

In some embodiments of the present disclosure, the frame 1 further includes a connecting column 13 arranged on the first side of the bearing plate 12 and spaced apart from the accommodating member 14. For example, the connecting column 13 is arranged on a center of the bearing plate 12, and the accommodating member 14 is arranged off the center of the bearing plate 12 by a certain distance. The connecting column 13 has a through hole 133 along its axis, and the bearing plate 12 has a second hole 122 aligned with the through hole 133 of the connecting column 13. The first holder 2 is fitted over the connecting column 13 and configured to rotate around the axis of the connecting column 13, and the second holder 3 is fitted in the second hole 122 of the bearing plate 12 and the through hole 133 of the connecting column 13, and configured to rotate around the axis of the connecting column 13.

Further, the through hole 133 matches with the second hole 122 in shape and size, so that the second holder 3 can be rotatably fitted in the second hole 122 of the bearing plate 12 and the through hole 133 of the connecting column 13.

In some embodiments of the present disclosure, the second hole 122 of the bearing plate 12 may overlap some of the plurality of openings 123. That is, a part of the bearing plate 12 which includes some of the plurality of openings 123 may be removed to form the second hole 122 of the bearing plate 12.

Moreover, a gap or a hole may be formed in a joint of the bearing plate 12 and the peripheral wall 11, so that the reagents can pass through the bearing plate 12 easily and smoothly, thus facilitating the processing and embedding of the tissue 4. Further, this gap or hole improves the stability of the paraffin block and facilitates the removal of the paraffin block.

In addition, the joint of the bearing plate 12 and the peripheral wall 11 may have a larger thickness than a rest part of the bearing plate 12, so that the strength of the connection between the bearing plate 12 and the peripheral wall 11 can be enhanced, thus further improving the structural strength of the frame 1.

Further, the peripheral wall 11 has an upper end and a lower end in a vertical direction, and the bearing plate 12 is surrounded by the peripheral wall 11 and arranged adjacent to the lower end of the peripheral wall 11, that is, the frame 1 has a concave shape as a whole, so that the bearing plate 12 can be submerged in the paraffin during the embedding of the tissue 4. Thus, the stability of the paraffin block can be improved.

In addition, a part of an outer surface of the peripheral wall 11 may be inclined outwards from the upper end of the peripheral wall 11 to the lower end of the peripheral wall 11, and a label may be adhered on the part of the outer surface of the peripheral wall 11. The label may contain information associated with a patient.

In some embodiments of the present disclosure, the first holder 2 includes a sleeve 21 and a first arm 22, the sleeve 21 is fitted over the connecting column 13, and the first arm 22 extends outwards from an outer peripheral surface of the sleeve 21. The sleeve 21 is configured to rotate around the connecting column 13 to drive the first arm 22 to open or close the first opening 141 of the accommodating member 14.

Further, the sleeve 21 has an upper end and a lower end in the vertical direction, and the first arm 22 is arranged at the upper end of the sleeve 21. Thus, when the sleeve 21 is arranged on the bearing plate 12 and fitted over the connecting column 13, the first arm 22 is located at a height larger than a height of the accommodating member 14, so that the first arm 22 can open or close the first opening 141 of the accommodating member 14 when the sleeve 21 rotates around the connecting column 13.

Furthermore, the first arm 22 is located at a height slightly larger than a height of the accommodating member 14. Thus, the first arm 22 can be closely fitted with an upper end of the accommodating member 14 and tightly close the first opening 141 of the accommodating member 14, thereby preventing the tissue 4 from falling out of the accommodating member 14 through the first opening 141.

In some embodiments of the present disclosure, the sleeve 21 includes first grooves 211 in its inner peripheral surface, and the first grooves 211 are spaced apart from one another along a circumferential direction of the sleeve 21. The connecting column 13 includes two first protrusions 132 on its outer peripheral surface. The two first protrusions 132 face away from each other in a diameter direction of the connecting column 13, and are configured to be fitted in two of the first grooves 211 when the first arm 22 opens or closes the first opening 141 of the accommodating member 14.

The first protrusion 132 matches with the first groove 211 in shape and size, so that the first protrusion 132 can be fitted in the first groove 211 stably, so as to keep the first holder 2 in a state of opening or closing the first opening 141 of the accommodating member 14.

It should be noted that the first protrusion 132 can be switched from one first groove 211 to another first groove 211, when an external force is applied to the first holder 2, so as to change the state of the first holder 2 of opening or closing the first opening 141 of the accommodating member 14. For example, the first holder 2 may have a shape which facilitates the first holder 2 to be grasped, so that the first holder 2 can be rotated by hands. Of course, the first holder 2 may also be rotated automatically by a corresponding machine, which is not limited herein.

Moreover, more than two first protrusions 132 may be provided, the number of the first protrusions 132 is the same with the number of the first grooves 211, and the first protrusions 132 may correspond with the first protrusions 132 one to one. Thus, the first holder 2 can be kept in the state of opening or closing the first opening 141 of the accommodating member 14 more stably.

In some embodiments, the first groove 211 extends along the axis of the connecting column 13 and terminates at a position between a top (i.e. the upper end) and a bottom (i.e. the lower end) of the sleeve 21. That is, the first groove 211 does not run through the whole inner peripheral surface of the sleeve 21 along the axis of the connecting column 13, and at least part of the inner peripheral surface of the sleeve 21 is complete, so that the sleeve 21 can be stably fitted over the connecting column 13 through the least part of the inner peripheral surface of the sleeve 21.

Accordingly, the first protrusion 132 is arranged at an upper end of the connecting column 13, so that it is convenient for the first protrusion 132 to be fitted in the first groove 211.

Further, the first groove 211 may have a chamfer at its edge, for example two vertical side edges and a lower edge, so that it is easy and convenient for the first protrusion 132 to be fitted into and separated from the first groove 211, and thus to be switched between the first grooves 211 smoothly.

In some embodiments, a free end of the first arm 22 has a shape matching with a shape of the first opening 141 of the accommodating member 14, and is provided with third holes 221. For example, both the free end of the first arm 22 and the first opening 141 of the accommodating member 14 have a circular shape. However, the present disclosure is not limited to this, and other shapes may be adopted, as long as the free end of the first arm 22 matches with the first opening 141 of the accommodating member 14 in shape and size.

Thus, the free end of the first arm 22 can be closely fitted with the first opening 141 of the accommodating member 14, and tightly closes the first opening 141 of the accommodating member 14 to prevent the tissue 4 from falling out of the accommodating member 14 through the first opening 141. Further, the third holes 221 in the free end of the first arm 22 allow the reagents to flow through the first arm 22, even if the first arm 22 closes the first opening 141 of the accommodating member 14.

In some embodiments of the present disclosure, as shown in FIGS. 1-8, four accommodating members 14 are provided, surround the connecting column 13, and spaced apart from one another. Accordingly, the first holder 2 includes four first arms 22 surrounding the sleeve 21 and spaced apart from one another. The four first arms 22 correspond with the four accommodating members 14 one to one, and each first arm 22 is configured to open or close the first opening 141 of the corresponding accommodating member 14. Further, the four accommodating members 14 and the four first arms 22 are distributed uniformly.

Thus, four tissues 4 can be processed and embedded at the same time, so that the processing and embedding efficiency of the tissue 4 can be improved. However, the present disclosure is not limited to this, and less than four tissues 4 or more than four tissues 4 can be processed and embedded. That is, less than four accommodating members 14 or more than four accommodating members 14 as well as less than four first arms 22 or more than four first arms 22 can be provided, as long as the first arms 22 have a one to one correspondence with the accommodating members 14.

In some embodiments of the present disclosure, as further shown in FIG. 9, the second holder 3 includes a base plate 31, a connecting shaft 32 and a second arm 33. The connecting shaft 32 is arranged on the base plate 31 and fitted in the through hole 133 of the connecting column 13. For example, the connecting shaft 32 is arranged on a center of the base plate 31. The second arm 33 extends outwards from an outer peripheral surface of the base plate 31. The base plate 31 and the second arm 33 are attached to the second side of the bearing plate 12, and the connecting shaft 32 is configured to rotate in the through hole 133 of the connecting column 13 around the axis of the connecting column 13 to drive the second arm 33 to open or close the first hole 121 of the bearing plate 12 and the second opening 142 of the accommodating member 14. That is, when the connecting shaft 32 rotates, the base plate 31 is driven to rotate, and thus the second arm 33 is also driven by the base plate 31 to rotate, so as to open or close the first hole 121 of the bearing plate 12 and the second opening 142 of the accommodating member 14.

Further, the connecting column 13 includes two groups of second grooves 131 in its inner peripheral surface, the two groups of second grooves 131 are opposite to each other in a diameter direction of the connecting column 13, and each group of second grooves 131 includes two adjacent second grooves 131. Accordingly, the connecting shaft 32 includes two second protrusions 321 on its outer peripheral surface, the two second protrusions 321 face away from each other in a diameter direction of the connecting shaft 32, and are configured to be fitted in the two groups of second grooves 131 when the second arm 33 opens or closes the first hole 121 of the bearing plate 12 and the second opening 142 of the accommodating member 14.

For example, when the second arm 33 closes the first hole 121 of the bearing plate 12 and the second opening 142 of the accommodating member 14, one second protrusion 321 is fitted in one of one group of second grooves 131, and the other second protrusion 321 is fitted in one of the other group of second grooves 131; when the connecting shaft 32 is rotated so that the second arm 33 opens the first hole 121 of the bearing plate 12 and the second opening 142 of the accommodating member 14, the one second protrusion 321 is fitted in the other one of the one group of second grooves 131, and the other second protrusion 321 is fitted in the other one of the other group of second grooves 131.

Further, the second protrusion 321 matches with the second groove 131 in shape and size, so that the second protrusion 321 can be fitted in the second groove 131 stably, so as to keep the second holder 3 in a state of opening or closing the second opening 142 of the accommodating member 14.

It should be noted that each second protrusion 321 can be switched between the two adjacent second grooves 131 in the corresponding group of second grooves 131, when an external force is applied to the second holder 3, so as to change the state of the second holder 3 of opening or closing the second opening 142 of the accommodating member 14.

In some embodiments, the second groove 131 extends along the axis of the connecting column 13 and terminates at a position between an upper end and a lower end of the connecting column 13. That is, the second groove 131 does not run through the whole inner peripheral surface of the connecting column 13 along the axis of the connecting column 13, and at least part of the inner peripheral surface of the connecting column 13 is complete, so that the connecting shaft 32 can be stably fitted in the connecting column 13 through the least part of the inner peripheral surface of the connecting column 13.

Accordingly, the second protrusion 321 is arranged at an upper end of the connecting shaft 32, so that it is convenient for the second protrusion 321 to be fitted in the second groove 131.

Further, the second groove 131 may have a chamfer at its edge, for example two vertical side edges and a lower edge, so that it is easy and convenient for the second protrusion 321 to be fitted into and separated from the second groove 131, and thus to be switched between the two adjacent second grooves 131 smoothly.

In some embodiments, the connecting shaft 32 includes a notch 322 in middle, and the two second protrusions 321 are arranged on two sides of the notch 322 and symmetrical with respect to the notch 322. Thus, a tool can be fitted in the notch 322 to apply a force to the second holder 3 so as to drive the second holder 3 to rotate. For example, the tool may be a wrench, a spanner, and so on.

Further, the notch 322 extends from the upper end of the connecting shaft 32 towards a lower end of the connecting shaft 32, and terminates at a position from the lower end of the connecting shaft 32 by a certain distance.

In this case, it is convenient to rotate the second holder 3 so as to open or close the second opening 142 of the accommodating member 14. For example, when the tissue 4 needs to be held in the accommodating member 14, the second holder 3 is rotated to close the second opening 142 of the accommodating member 14; when the tissue 4 in the accommodating member 14 needs to be pushed into the mold, the second holder 3 is rotated to open the second opening 142 of the accommodating member 14.

In some embodiments of the present disclosure, as shown in FIGS. 1-6 and 9, four accommodating members 14 are provided, surround the connecting column 13, and spaced apart from one another. Further, the bearing plate 12 has four first holes 121 aligned with the second openings 142 of the four accommodating members 14, respectively. Accordingly, the second holder 3 includes four second arms 33 surrounding the base plate 31 and spaced apart from one another. The four second arms 33 correspond with the four accommodating members 14 one to one, and each second arm 33 is configured to open or close the corresponding first hole 121 and the second opening 142 of the corresponding accommodating member 14. Further, the four accommodating members 14 and the four second arms 33 are distributed uniformly.

Thus, four tissues 4 can be processed and embedded at the same time, so that the processing and embedding efficiency of the tissue 4 can be improved. However, the present disclosure is not limited to this, and less than four tissues 4 or more than four tissues 4 can be processed and embedded. That is, less than four accommodating members 14 or more than four accommodating members 14 as well as less than four second arms 33 or more than four second arms 33 can be provided, as long as the second arms 33 have a one to one correspondence with the accommodating members 14.

It should be noted that the numbers of the accommodating members 14, the first arms 22 and the second arms 33 are the same, but not limited herein, as long as the accommodating members 14, the first arms 22 and the second arms 33 have a one to one correspondence with one another.

Further, a free end of the second arm 33 has a shape matching with a cross-sectional shape of the first hole 121 of the bearing plate 12 and a shape of the second opening 142 of the accommodating member 14, and is provided with fourth holes 331. For example, the free end of the second arm 33, a cross section of the first hole 121 of the bearing plate 12 and the second opening 142 of the accommodating member 14 have a circular shape. However, the present disclosure is not limited to this, and other shapes may be adopted, as long as the free end of the second arm 33 matches with the cross section of the first hole 121 of the bearing plate 12 and the second opening 142 of the accommodating member 14 in shape and size.

Thus, the free end of the second arm 33 can be closely fitted with the first hole 121 of the bearing plate 12 and the second opening 142 of the accommodating member 14, and tightly closes the first hole 121 of the bearing plate 12 and the second opening 142 of the accommodating member 14 to prevent the tissue 4 from falling out of the accommodating member 14. Further, the fourth holes 331 in the free end of the second arm 33 allow the reagents to flow through the second arm 33, even if the second arm 33 closes the first hole 121 of the bearing plate 12 and the second opening 142 of the accommodating member 14.

In some embodiments, as shown in FIG. 6, the second side of the bearing plate 12 includes a recessed part 15, the base plate 31 and the second arm 33 of the second holder 3 are received in the recessed part 15, and configured to rotate in the recessed part 15 under the drive of the connecting shaft 32.

It can be understood that the recessed part 15 has a shape corresponding to and larger than a whole shape of the base plate 31 and the second arm 33, so that the base plate 31 and the second arm 33 can be fitted in the recessed part 15 and also rotated in the recessed part 15.

Further, bottom surfaces of the base plate 31 and the second arm 33 of the second holder 3 are flush with the second side of the bearing plate 12. That is, the base plate 31 and the second arm 33 do not protrude out of the recessed part 15.

Thus, the paraffin block which is finally obtained has a regular shape, so that it is convenient to remove the paraffin block and the stability of the paraffin block can be further improved.

Figure 2:
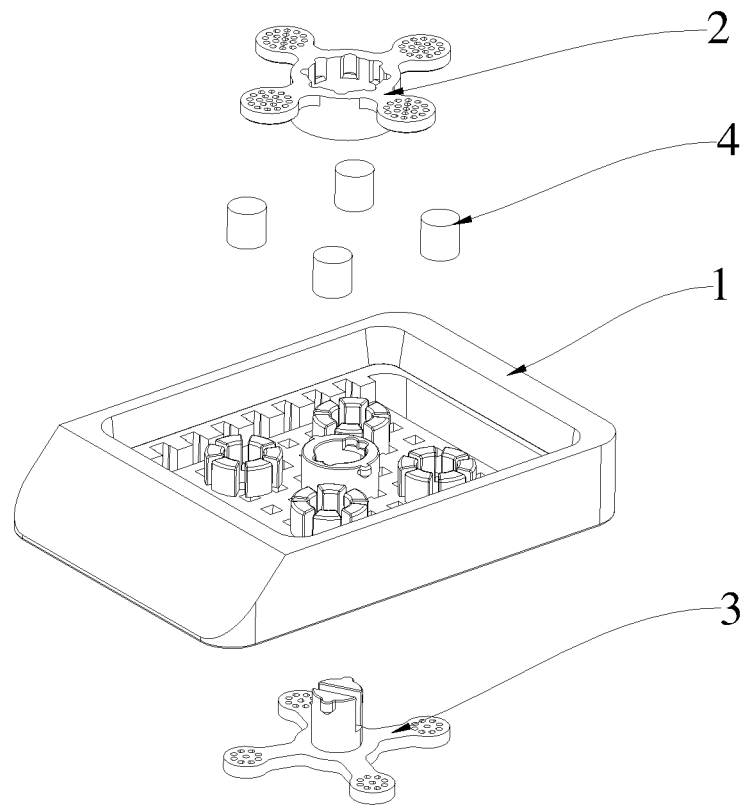
FIG. 2 is an exploded view of a cassette with a tissue according to an embodiment of the present disclosure.
Figure 3:
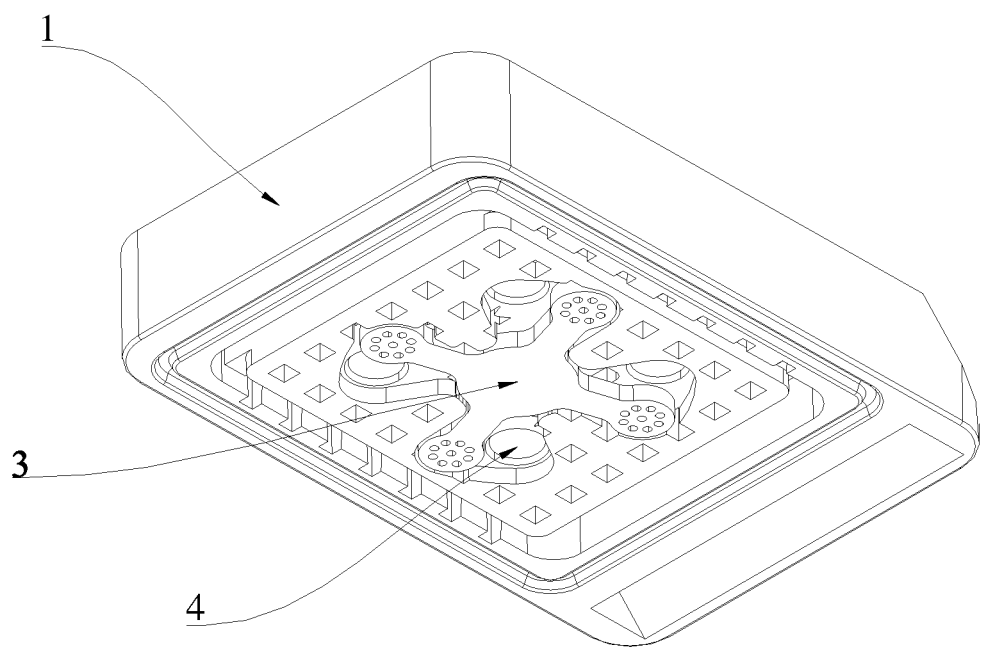
FIG. 3 is another perspective view of a cassette with a tissue according to an embodiment of the present disclosure.
Figure 4:
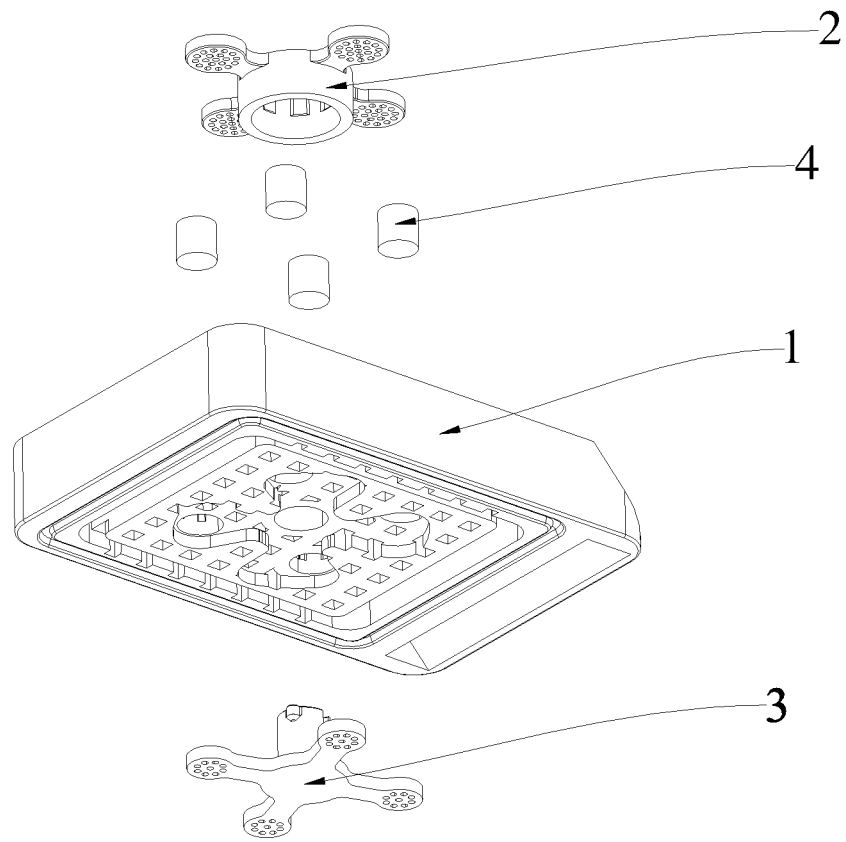
FIG. 4 is another exploded view of a cassette with a tissue according to an embodiment of the present disclosure.

In some embodiments of the present disclosure, as shown in FIGS. 1, 2 and 5, the accommodating member 14 includes a plurality of vertical parts 143 surrounding the first hole 121 of the bearing plate 12 and spaced apart from one another. Each vertical part 143 has an arc cross section, and the arc cross sections of the plurality of vertical parts 143 cooperate with one another to form a shape (for example, a substantially circle shape) matching with the cross-sectional shape of the first hole 121 of the bearing plate 12. However, the present disclosure is not limited to this. That is, the arc cross sections of the plurality of vertical parts 143 may cooperate with one another to form another shape, as long as this shape matches with the cross-sectional shape of the first hole 121 of the bearing plate 12.

In this case, a gap is defined between adjacent two vertical parts 143, so that the reagents can flow through the gaps among the vertical parts 143 while being dispensed into the cassette 100. Thus, the reagents can flow through the cassette 100 smoothly.

Embodiments of the present disclosure further provide an embedding method 1000, which uses the cassette 100 according to the above embodiments of the present disclosure, as shown in FIGS. 10-13. The embedding method 1000 includes following steps shown in FIG. 11.

At step 1001, the cassette 100 with the tissue 4 is placed on a mold 200, in which the first holder 2 closes the first opening 141 of the accommodating member 14 and the second holder 3 closes the second opening 142 of the accommodating member 14, as shown in FIG. 10A. In this case, the tissue 4 is held in the accommodating member 14 by the first holder 2 and the second holder 3.

At step 1002, the first holder 2 is rotated to open the first opening 141 of the accommodating member 14, as shown in FIG. 10B. Thus, bubbles can be prevented from be generated during following dispensing.

At step 1003, liquid paraffin is dispensed into the cassette 100 and the mold 200, and the liquid paraffin is cooled in the mold 200 to a semi-molten state, as shown in FIG. 10C. That is, the liquid paraffin is pre-dispensed into the cassette 100 and the mold 200. Thus, the paraffin in the semi-molten state can support the tissue 4 when the second holder 3 opens the second opening 142 of the accommodating member 14.

At step 1004, the second holder 3 is rotated to open the second opening 142 of the accommodating member 14, as shown in FIG. 10D. In this case, the tissue 4 will not fall into the mold 200 due to the support of the paraffin in the semi-molten state in the mold 200.

At step 1005, the tissue 4 is pushed into the mold 200, as shown in FIG. 10E. When an enough external force is applied to the tissue 4, the tissue 4 can be pushed into the mold 200 against the support of the paraffin in the semi-molten state.

At step 1006, further liquid paraffin is dispensed into the cassette 100 and the mold 200, as shown in FIG. 10F. That is, additional liquid paraffin is further dispensed into the cassette 100 and the mold 200 for final-dispensing.

At step 1007, the liquid paraffin is cooled in the cassette 100 and the mold 200 to a solid state, as shown in FIG. 10H.

In the embedding method 1000 according to the embodiments of the present disclosure, the first holder 2 and the second holder 3 are rotated to open or close the openings of the accommodating member 14 in corresponding steps, so that the tissue 4 can be pushed into the mold 200 without being taken out of the cassette 100, and the paraffin block including the tissue 4 can be obtained without the second holder 3 (i.e. the bottom part of the cassette 100). That is, the bottom part of the cassette 100 does not need to be cut, and no cassette material remains around the tissue 4. Thus, the lifetime of a blade of a microtome is improved, and the slides quality and the slides viewing and diagnosing are improved. Further, it is easy and convenient to embed the tissue 4 with the embedding method 1000, thus enhancing the working efficiency of a user.

In some embodiments of the present disclosure, the tissue 4 is pushed into the mold 200 by a pusher 300, as shown in FIGS. 10E and 10F. The pusher 300 is known in the related art. For example, the pusher 300 may include a plate and a rod arranged on the plate, so that the user may grasp the plate and forward the rod into the accommodating member 14, so as to push the tissue 4 out of the accommodating member 14 and into the mold 200.

In this case, the embedding method 1000 further includes step 1008. At step 1008, the pusher 300 is withdrawn, as shown in FIG. 10G. Specifically, the pusher 300 may be withdrawn after or before further liquid paraffin is dispensed into the cassette 100 and the mold 200, as shown in FIGS. 12 and 13.

FIG. 10 illustrates that the pusher 300 is withdrawn after further liquid paraffin is dispensed into the cassette 100 and the mold 200.

When the pusher 300 is withdrawn before further liquid paraffin is dispensed into the cassette 100 and the mold 200, the embedding method 1000 further includes step 1009. At step 1009, the second holder 3 is rotated to close the second opening 142 of the accommodating member 14 after the pusher 300 is withdrawn and before further liquid paraffin is dispensed into the cassette 100 and the mold 200, as shown in FIG. 13.

Figure 12:
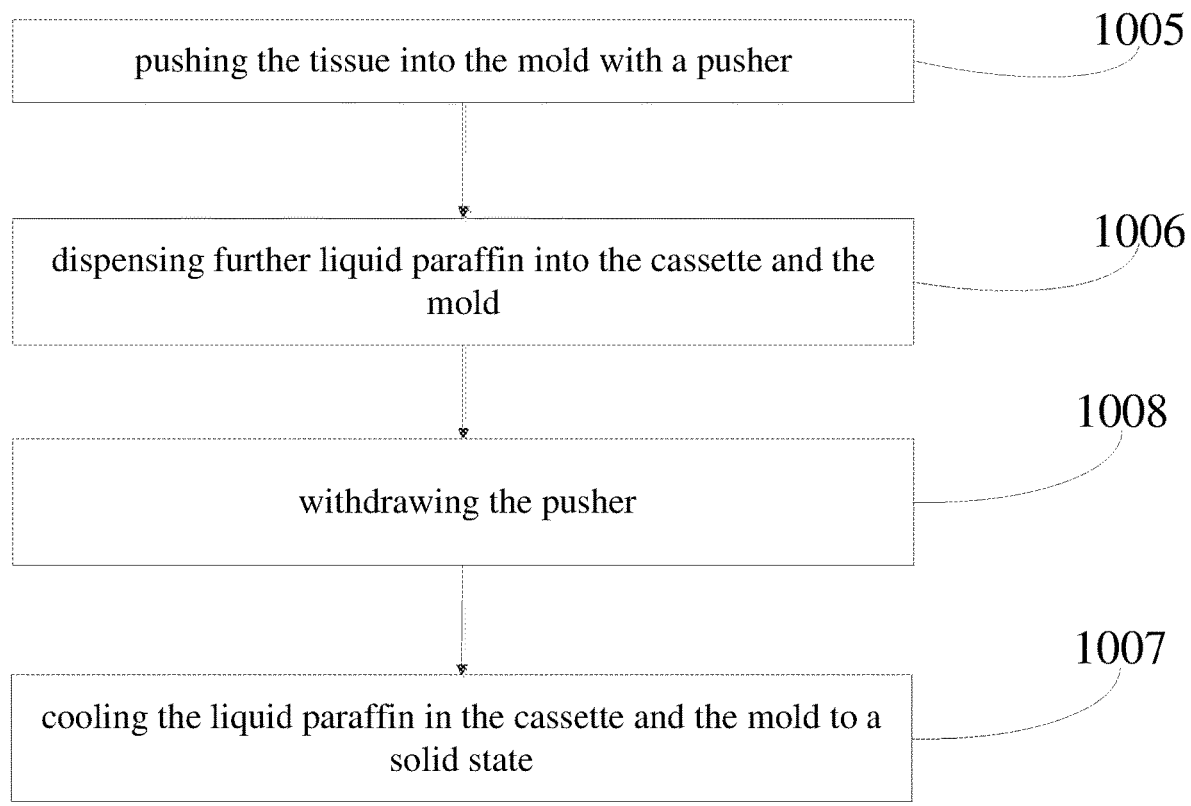
FIG. 12 is a block diagram of an embedding method according to an embodiment of the present disclosure.
Figure 13:
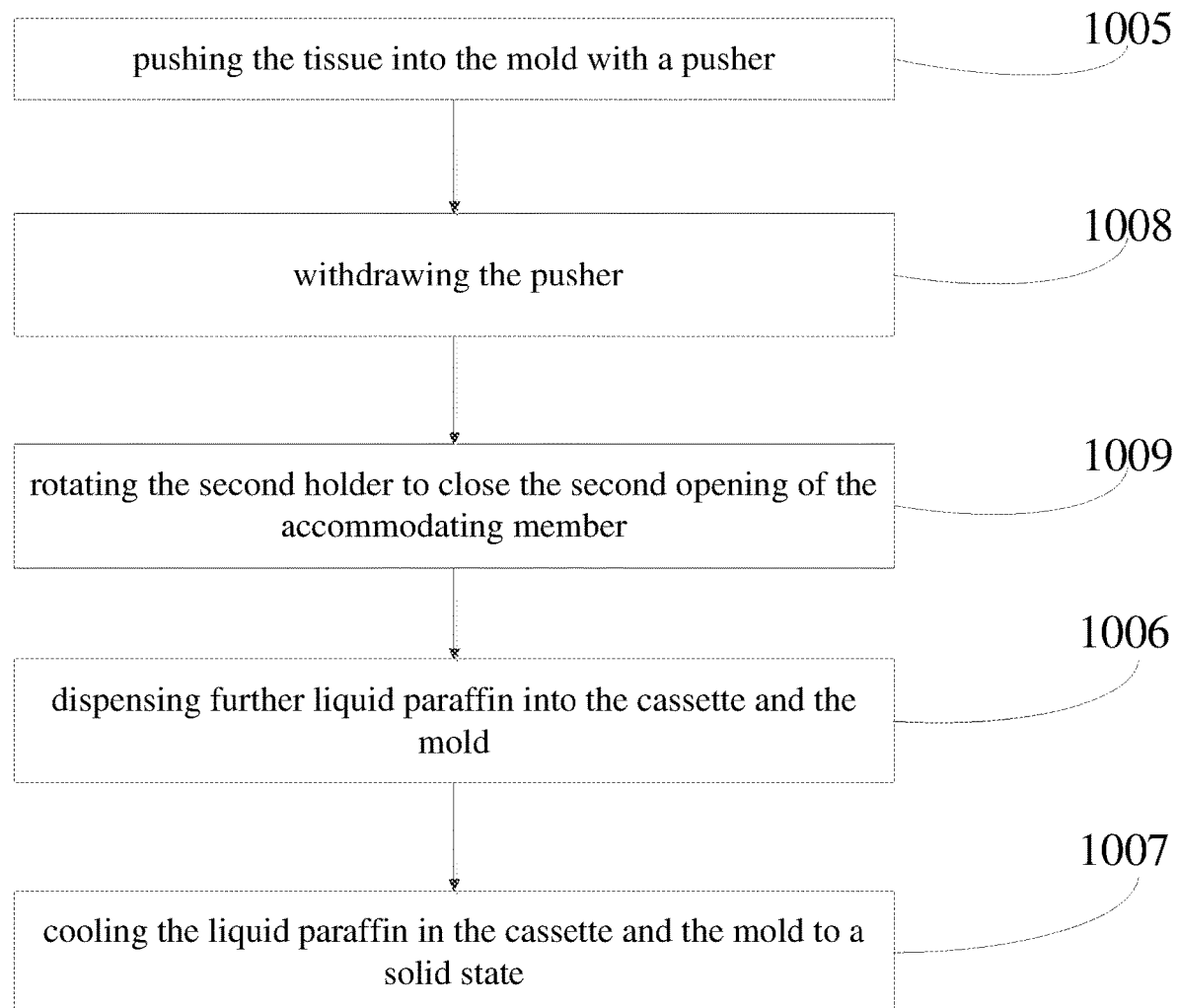
FIG. 13 is a block diagram of an embedding method according to an embodiment of the present disclosure.

It should be noted that steps 1001-1004 should also be included in the embedding methods 1000 shown in FIGS. 12 and 13, but are omitted for simplification herein.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cassette (100) for a tissue (4), comprising:
   a frame (1) comprising an accommodating member (14) configured to accommodate the tissue (4), the accommodating member (14) having a first opening (141) and a second opening (142) opposite to each other;
   a first holder (2) connected to the frame (1), and configured to rotate relative to the frame (1) to open or close the first opening (141) of the accommodating member (14); and
   a second holder (3) connected to the frame (1), and configured to rotate relative to the frame (1) to open or close the second opening (142) of the accommodating member (14),
   wherein the frame (1) comprises:
   a peripheral wall (11); and
   a bearing plate (12) surround by the peripheral wall (11) and connected to the peripheral wall (11), the bearing plate (12) comprising a first side and a second side facing away from each other,
   wherein the accommodating member (14) is arranged on the first side of the bearing plate (12), the bearing plate (12) has a first hole (121) aligned with the second opening (142) of the accommodating member (14), the first holder (2) is arranged on the first side of the bearing plate (12) and configured to rotate relative to the bearing plate (12) to open or close the first opening (141) of the accommodating member (14), and the second holder (3) is arranged on the second side of the bearing plate (12) and configured to rotate relative to the bearing plate (12) to open or close the first hole (121) of the bearing plate (12) and the second opening (142) of the accommodating member (14).

2. The cassette (100) according to claim 1, wherein the bearing plate (12) is provided with a plurality of openings (123) arranged in an array, and each opening (123) runs through the bearing plate (12) in a thickness of the bearing plate (12).

3. The cassette (100) according to claim 1, wherein the frame (1) further comprises a connecting column (13) arranged on the first side of the bearing plate (12) and spaced apart from the accommodating member (14), the connecting column (13) has a through hole (133) along an axis thereof, the bearing plate (12) has a second hole (122) aligned with the through hole (133) of the connecting column (13), the first holder (2) is fitted over the connecting column (13) and configured to rotate around the axis of the connecting column (13), and the second holder (3) is fitted in the second hole (122) of the bearing plate (12) and the through hole (133) of the connecting column (13), and configured to rotate around the axis of the connecting column (13).

4. The cassette (100) according to claim 3, wherein the first holder (2) comprises a sleeve (21) fitted over the connecting column (13) and a first arm (22) extending outwards from an outer peripheral surface of the sleeve (21),
the sleeve (21) is configured to rotate around the connecting column (13) to drive the first arm (22) to open or close the first opening (141) of the accommodating member (14).

5. The cassette (100) according to claim 4, wherein the sleeve (21) comprises first grooves (211) in an inner peripheral surface thereof, the first grooves (211) are spaced apart from one another along a circumferential direction of the sleeve (21),
the connecting column (13) comprises two first protrusions (132) on an outer peripheral surface thereof, the two first protrusions (132) face away from each other in a diameter direction of the connecting column (13), and are configured to be fitted in two of the first grooves (211) when the first arm (22) opens or closes the first opening (141) of the accommodating member (14).

6. The cassette (100) according to claim 5, wherein the first groove (211) extends along the axis of the connecting column (13) and terminates at a position between a top and a bottom of the sleeve (21).

7. The cassette (100) according to claim 4, wherein a free end of the first arm (22) has a shape matching with a shape of the first opening (141) of the accommodating member (14), and is provided with third holes (221).

8. The cassette (100) according to claim 4, wherein four accommodating members (14) are provided, surround the connecting column (13), and are spaced apart from one another,
the first holder (2) comprises four first arms (22) surrounding the sleeve (21) and spaced apart from one another,
the four first arms (22) correspond with the four accommodating members (14) one to one, and each first arm (22) is configured to open or close the first opening (141) of the corresponding accommodating member (14).

9. The cassette (100) according to claim 3, wherein the second holder (3) comprises:
a base plate (31);
a connecting shaft (32) arranged on the base plate (31) and fitted in the through hole (133) of the connecting column (13); and
a second arm (33) extending outwards from an outer peripheral surface of the base plate (31),
wherein the base plate (31) and the second arm (33) are attached to the second side of the bearing plate (12), and the connecting shaft (32) is configured to rotate in the through hole (133) of the connecting column (13) around the axis of the connecting column (13) to drive the second arm (33) to open or close the first hole (121) of the bearing plate (12) and the second opening (142) of the accommodating member (14).

10. The cassette (100) according to claim 9, wherein the connecting column (13) comprises two groups of second grooves (131) in an inner peripheral surface thereof, the two groups of second grooves (131) are opposite to each other in a diameter direction of the connecting column (13), and each group of second grooves (131) comprises two adjacent second grooves (131),
the connecting shaft (32) comprises two second protrusions (321) on an outer peripheral surface thereof, the two second protrusions (321) face away from each other in a diameter direction of the connecting shaft (32), and are configured to be fitted in the two groups of second grooves (131) when the second arm (33) opens or closes the first hole (121) of the bearing plate (12) and the second opening (142) of the accommodating member (14).

11. The cassette (100) according to claim 10, wherein the connecting shaft (32) comprises a notch (322) in middle, and the two second protrusions (321) are arranged on two sides of the notch (322) and symmetrical with respect to the notch (322).

12. The cassette (100) according to claim 9, wherein four accommodating members (14) are provided, surround the connecting column (13), and are spaced apart from one another,
the bearing plate (12) has four first holes (121) aligned with the second openings (142) of the four accommodating members (14), respectively,
the second holder (3) comprises four second arms (33) surrounding the base plate (31) and spaced apart from one another,
the four second arms (33) correspond with the four accommodating members (14) one to one, and each second arm (33) is configured to open or close the corresponding first hole (121) and the second opening (142) of the corresponding accommodating member (14).

13. The cassette (100) according to claim 9, wherein a free end of the second arm (33) has a shape matching with a cross-sectional shape of the first hole (121) of the bearing plate (12) and a shape of the second opening (142) of the accommodating member (14), and is provided with fourth holes (331).

14. The cassette (100) according to claim 9, wherein the second side of the bearing plate (12) comprises a recessed part (15), the base plate (31) and the second arm (33) of the second holder (3) are received in the recessed part (15), and configured to rotate in the recessed part (15) under the drive of the connecting shaft (32).

15. The cassette (100) according to claim 14, wherein bottom surfaces of the base plate (31) and the second arm (33) of the second holder (3) are flush with the second side of the bearing plate (12).

16. The cassette (100) according to claim 1, wherein the accommodating member (14) comprises a plurality of vertical parts (143) surrounding the first hole (121) of the bearing plate (12) and spaced apart from one another,
each vertical part (143) has an arc cross section, and the arc cross sections of the plurality of vertical parts (143) cooperate with one another to form a shape matching with a cross-sectional shape of the first hole (121) of the bearing plate (12).

17. An embedding method, using a cassette for a tissue according to claim 1, the embedding method comprising:
placing the cassette with the tissue on a mold, in which the first holder closes the first opening of the accommodating member and the second holder closes the second opening of the accommodating member;
rotating the first holder to open the first opening of the accommodating member;

dispensing liquid paraffin into the cassette and the mold, and cooling the liquid paraffin in the mold to a semi-molten state;
rotating the second holder to open the second opening of the accommodating member;
pushing the tissue into the mold;
dispensing further liquid paraffin into the cassette and the mold; and
cooling the liquid paraffin in the cassette and the mold to a solid state.

18. The embedding method according to claim 17, wherein the tissue is pushed into the mold by a pusher, and the embedding method further comprises withdrawing the pusher after or before dispensing further liquid paraffin into the cassette and the mold.

19. The embedding method according to claim 18, wherein when the pusher is withdrawn before dispensing further liquid paraffin into the cassette and the mold, the embedding method further comprises rotating the second holder to close the second opening of the accommodating member after withdrawing the pusher and before dispensing further liquid paraffin into the cassette and the mold.

* * * * *